United States Patent [19]
Bapst

[11] Patent Number: 6,079,780
[45] Date of Patent: *Jun. 27, 2000

[54] SEATING HEIGHT INDICATOR FOR CAR SEAT

[75] Inventor: David M. Bapst, South Wales, N.Y.

[73] Assignee: Mattel Inc., El Segundo, Calif.

[ * ] Notice: This patent is subject to a terminal disclaimer.

[21] Appl. No.: 09/141,024

[22] Filed: Aug. 27, 1998

Related U.S. Application Data

[63] Continuation of application No. 08/738,051, Oct. 25, 1996, Pat. No. 5,845,967.

[51] Int. Cl.[7] .............................. A47C 1/08; A47D 1/10
[52] U.S. Cl. ......................... 297/250.1; 33/512; 33/758; 33/759; 33/679.1; 116/200
[58] Field of Search .......................... 297/250.1; 33/511, 33/512, 515, 485, 679.1, 483, 494, 755, 758, 759; 116/200, 201, 278, 280, DIG. 14

[56] References Cited

U.S. PATENT DOCUMENTS

| | | | |
|---|---|---|---|
| 2,197,031 | 4/1940 | Davis | 33/759 |
| 3,020,643 | 2/1962 | Moran | 33/512 X |
| 3,425,387 | 2/1969 | Mitchell | 116/200 |
| 3,621,579 | 11/1971 | Dubitsky | 33/758 |
| 4,118,868 | 10/1978 | Johnson | 33/512 |
| 4,939,849 | 7/1990 | Johnson | 33/512 X |
| 5,286,086 | 2/1994 | Gunji | 297/250.1 |
| 5,458,398 | 10/1995 | Meeker et al. | 297/250.1 |
| 5,813,132 | 9/1998 | Bodkin, Sr. | 33/512 X |
| 5,845,967 | 12/1998 | Kane et al. | 297/250.1 |
| 5,964,502 | 10/1999 | Stephens | 297/250.1 |

FOREIGN PATENT DOCUMENTS

| | | | |
|---|---|---|---|
| 770829 | 9/1934 | France | 33/679.1 |
| 2154131 | 9/1985 | United Kingdom | 297/250.1 |

*Primary Examiner*—Peter M. Cuomo
*Assistant Examiner*—Rodney B. White
*Attorney, Agent, or Firm*—Morgan, Lewis & Bockius LLP; James L. Reed

[57] ABSTRACT

A child's booster seat is configured to be molded in a single piece, with an upper, back portion and a lower, seat portion connected by an integral hinge. The upper and lower portions can be pivoted about the hinge so that integral mortise and tenon structures are brought into engagement and can be pinned to hold the seat in an upright, use configuration. Indicia are disposed on the upper portion to show maximum and minimum suitable seated heights for child occupants of the seat. An adjustable shoulder belt positioned is disposed on the upper portion.

31 Claims, 9 Drawing Sheets

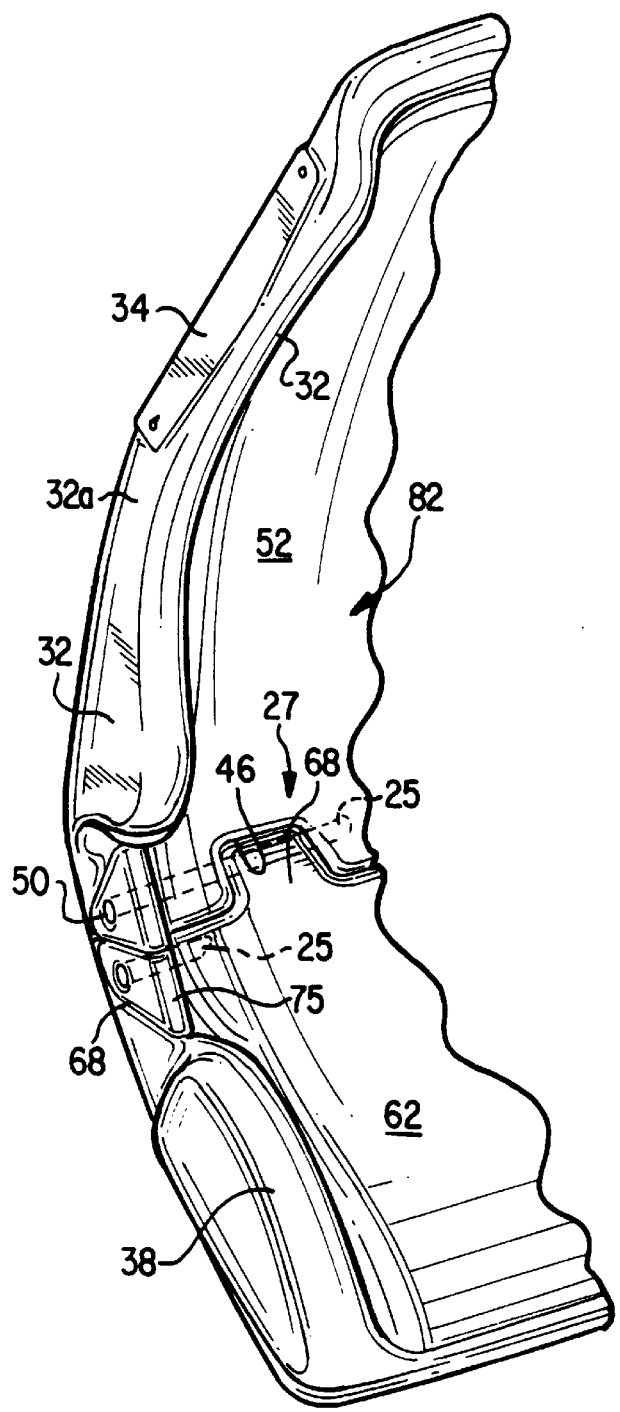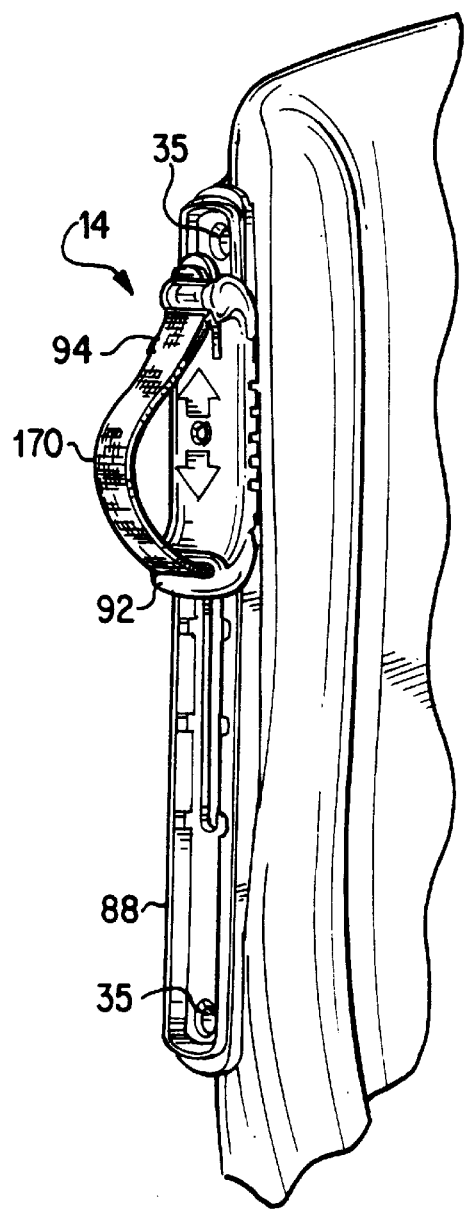
FIG. 4
FIG. 5

SEATING HEIGHT INDICATOR FOR CAR SEAT

This application claims priority under 35 U.S.C. § 120 based on U.S. application Ser. No. 08/738,051 filed Oct. 25, 1996 now U.S. Pat. No. 5,845,967.

The present invention generally relates to children's booster seats and particularly to booster seats incorporating adjustable shoulder belt positioners and size indicia for marking upper and lower height limits for children using the seats.

BACKGROUND OF THE INVENTION

Passenger restraint systems in automobiles are generally well suited to properly restrain adults but not well suited to properly restrain children. Accordingly, vehicle restraint systems must be supplemented by devices such as booster seats, which may be broadly defined as a seat that relies primarily on the vehicle's lap and shoulder belts to retain the seat in the vehicle and to restrain the child's torso, and includes a seat portion on which the child is seated to elevate the child above the vehicle's seating surface to a position in which the vehicle's shoulder belt is better positioned on the child, and may also include a back portion. A common construction technique for booster seats with backs is to mold the seat and back portions from rigid plastic and cover them with a cushion or pad.

Known booster seats designs suffer from several drawbacks. First, large L-shaped bodies (such as seats with back portions) tend to be relatively expensive and difficult to mold in one piece, especially if the seat includes wings and a lap belt path. Second, known booster seats do not adequately address the need to adjust and maintain the position of the vehicle shoulder belt relative to child's shoulder, particularly for children of different heights. Third, parents sometimes unknowingly use a booster seat for a child that is too small for the seat or a child that has outgrown the seat.

The manufacturing expense associated with a rigid molded body derives from the complex molding process required. One solution is to mold the seat as a plurality of separate, less complex, pieces and assemble the separate pieces into a rigid whole. Unfortunately, molding the seat as separate pieces requires additional tooling to mold the separate pieces and adds assembly steps, both of which add to the cost of manufacture. Thus, the savings due to less complex molding is offset by increased manufacturing and assembly costs. A molding technique that reduces complexity without increasing the number of molded pieces while allowing simple assembly would be welcome by seat manufacturers.

The failure to properly position the vehicle's shoulder belt relative to the child's shoulder can compromise the effectiveness of a booster seat. For optimum restraining effectiveness in an accident, the vehicle shoulder belt should lie on the child's shoulder. If the belt is positioned too high, the belt can impact the child's chin or neck, causing injury to soft tissue. If the shoulder belt is too low, it will lie off the child's shoulder, where it becomes relatively ineffective. It is therefore important to provide some mechanism for adjusting the shoulder belt's position to fit the child. Known devices for providing such adjustment suffer from drawbacks.

One design approach uses a fabric loop that is attached to the seat by hook and loop fasteners and which is wrapped around the shoulder belt to capture the belt and therefore to position the belt relative to the seat. One problem with this design approach is that he loops can be relatively easily dislodged as, for example, when the child shifts position in the car seat. When the loop becomes dislodged, it must be relocated, which can be inconvenient. A better approach would be an adjustable belt positioner that is firmly attached to the seat to avoid being inadvertently dislodged and, therefore, more convenient and effective.

The third problem, like the second, is directly related to the size of the child using the booster seat. Booster seats are designed to fit children that fall within a certain size range. Placing a child that is too tall or too short in the seat may results in improper placement of the shoulder belt on the child and therefore a less effective restraint. Although seats are typically provided with explicit instructions to the user as to the approach size range for the seat, careless or inattentive parents may overlook or ignore these instructions and place an over- or under-sized child in the seat. Proper use of the seat could be made more likely if the seat included a direct visual indicator of whether a child is sized to safely use the seat.

SUMMARY OF THE INVENTION

The present invention provides a high back booster seat that overcomes the problems associated with known booster seats. In particular, the present invention provides a molding technique that permits a booster seat to be molded in a single piece having an upper back portion and a lower seat portion connected by an integral hinge. The upper and lower portions are pivoted about the integral hinge toward each other to form a rigid body, and cooperate to form a plurality of mortise and tenon joints. The upper and lower portions are locked in the rigid body configuration by a pair of side plates and a pair of locking rods extending through the seat between the side plates.

The invention also includes an adjustable belt positioner that is configured to move between a plurality of different adjustment positions. The upper and lower positions are located to accommodate the full range of sizes of children of a child sitting in the booster seat. While the positioner is movable, it is firmly coupled to the seat.

The invention further includes indicia for indicating height limitations of a child sitting in the seat. The indicia can be labels attached to a seat cover disposed on the seat. Appropriately, the positions of the adjustable belt positioner can be located to accommodate children whose size falls within the indicated size limitations.

BRIEF DESCRIPTION OF THE DRAWINGS

FIG. 4. is a partial isometric view of the shell of FIGS. 2–3 in a booster seat configuration.

FIG. 5 is a perspective view of a seat belt positioner for use with the seat of FIG. 1.

FIG. 10b is a longitudinal section view of the spring taken along line 10b–10b of FIG. 10a.

DETAILED DESCRIPTION OF THE DRAWINGS

Figure 1:
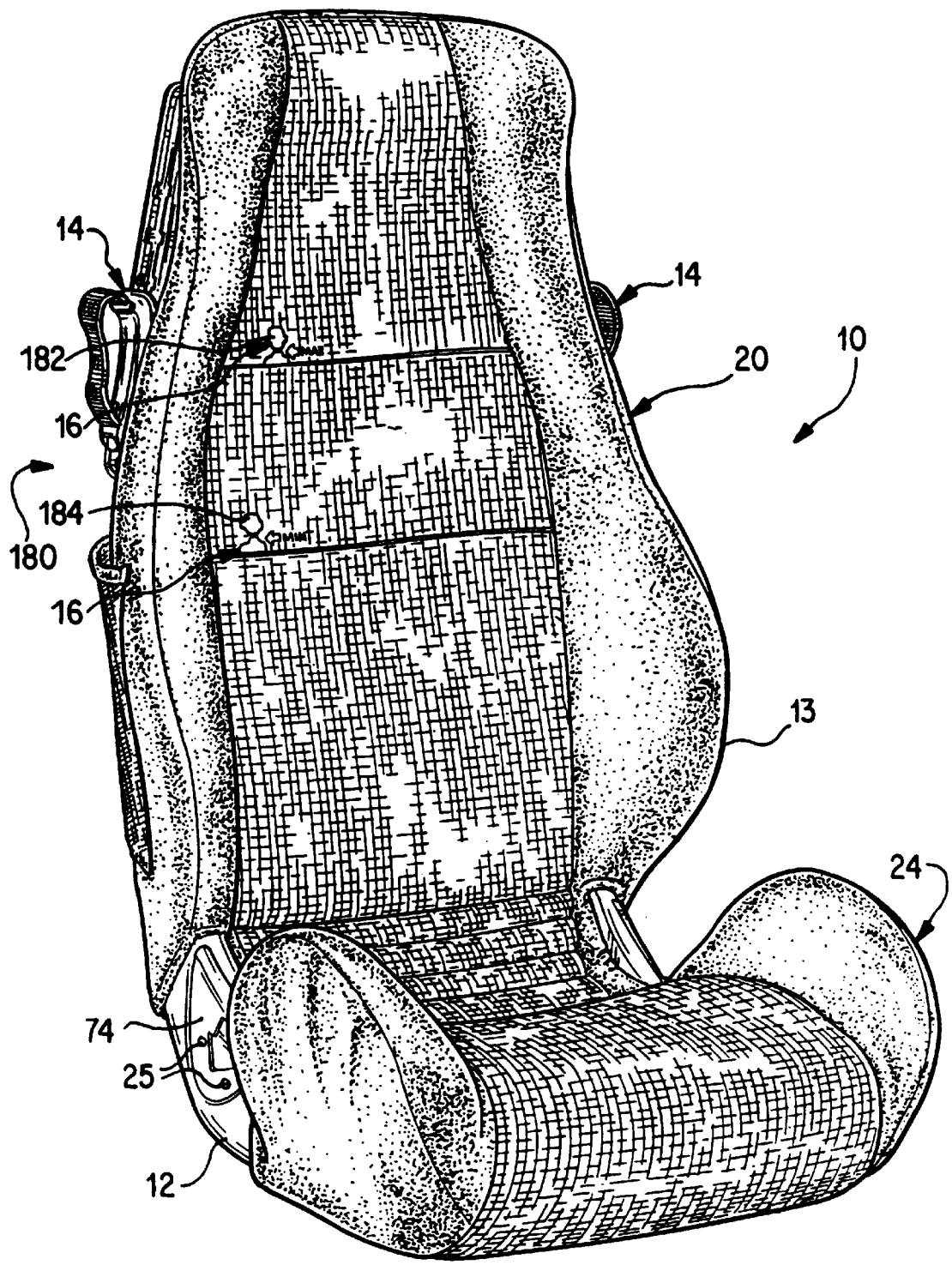
FIG. 1 is a perspective view of a booster seat illustrating the adjustable belt positioner and size indicia.
Figure 3:
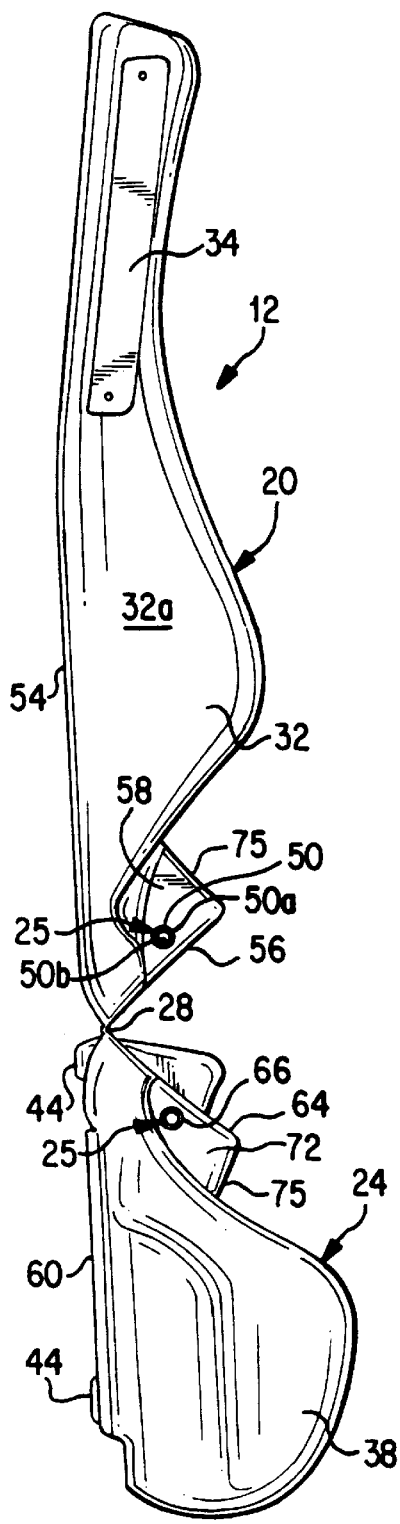
FIG. 3 is a side view of the shell in the flat configuration.
Figure 2:
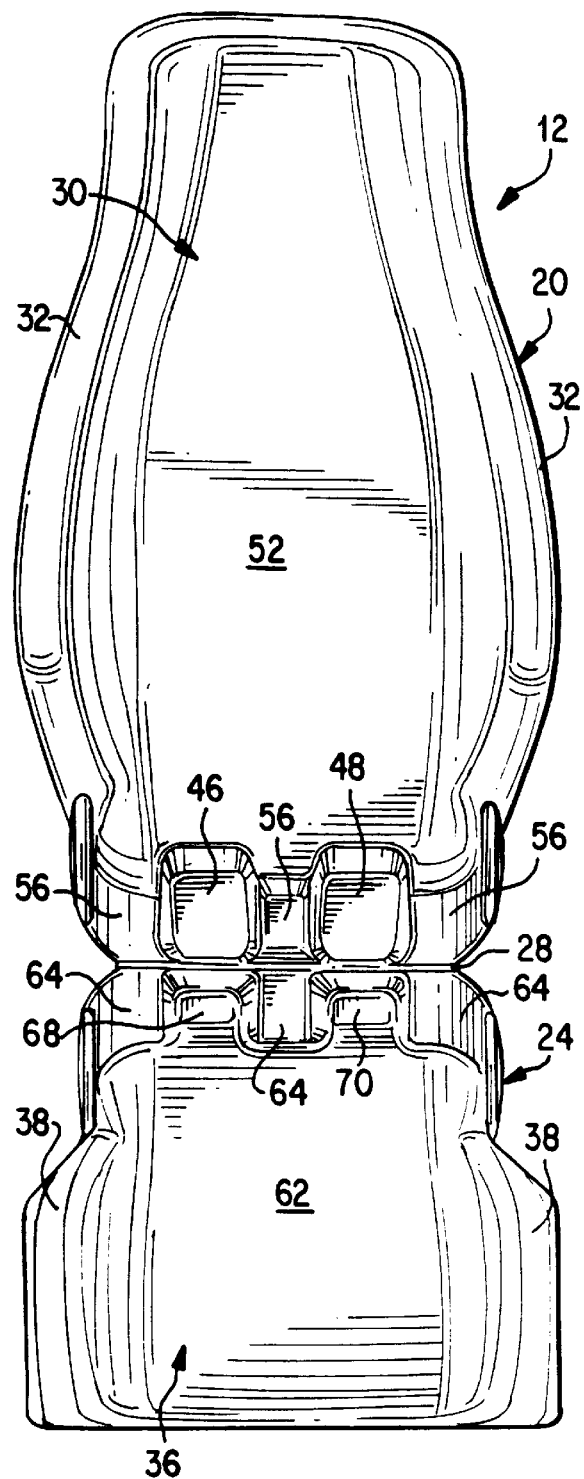
FIG. 2 is a plan view of a seat shell for use with the booster seat of FIG. 1 in a flat, as-molded, configuration.
Figure 6A:
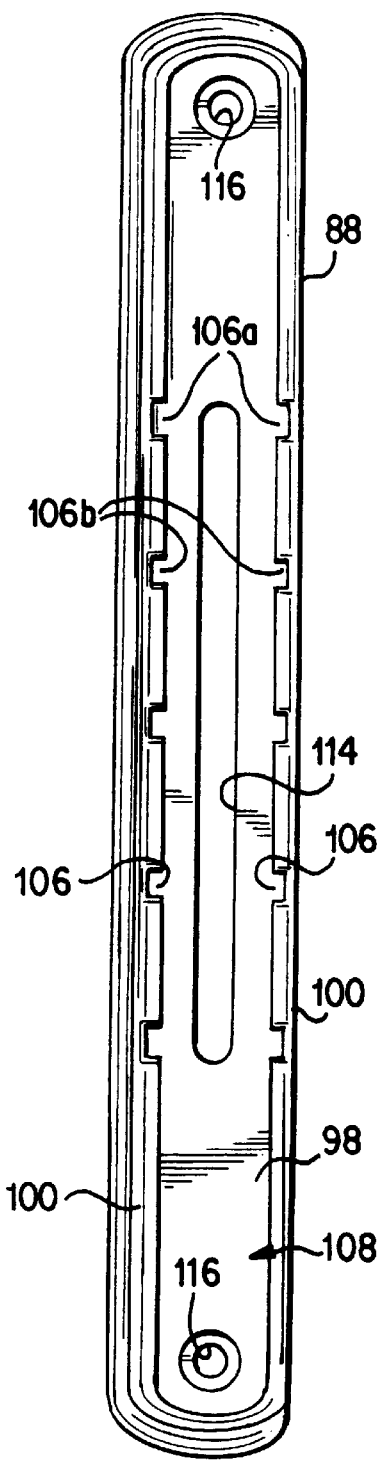
FIGS. 6a–6b are top and bottom views, respectively, of a rack for use with the belt positioner of FIG. 5.
Figure 6C:
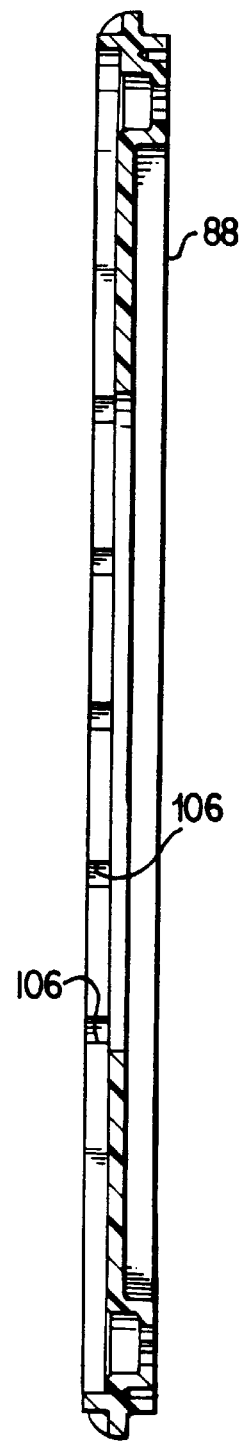
FIG. 6c is a longitudinal section view of the rack of FIGS. 6a–6b.
Figure 6B:
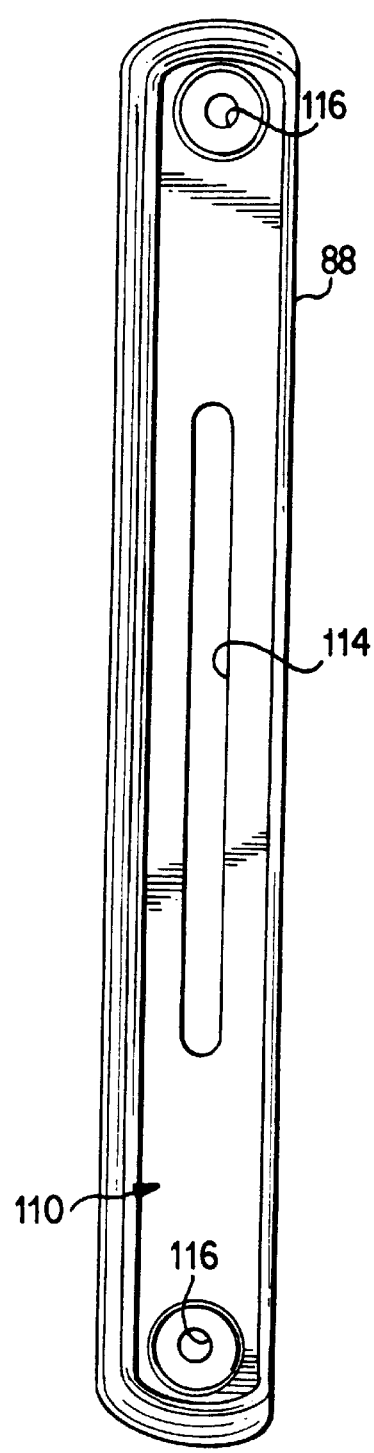
Figure 7A:
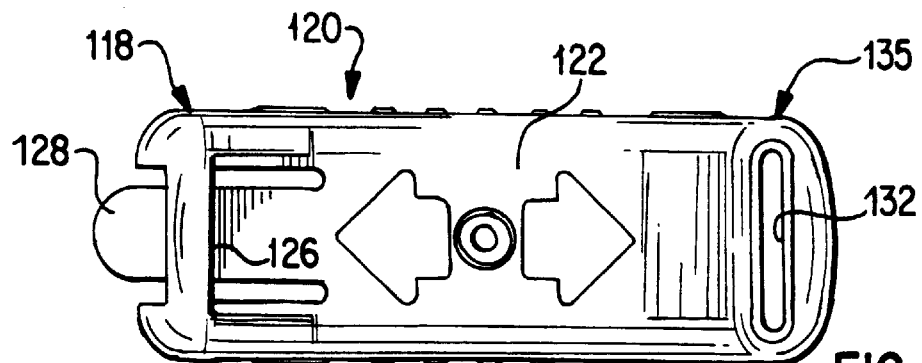
FIGS. 7a–7d are top, side, bottom and end views, respectively, of a cover plate for use with the belt positioner of FIG. 5.
Figure 7B:
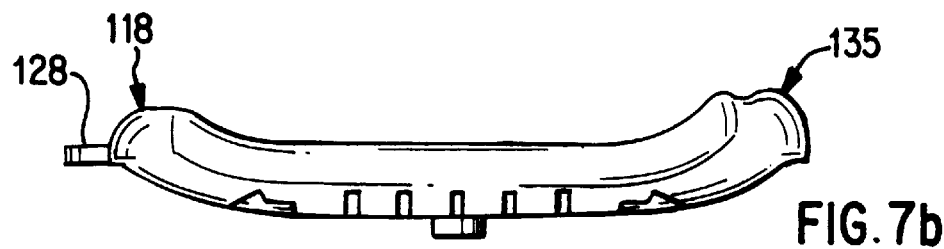
Figure 7C:
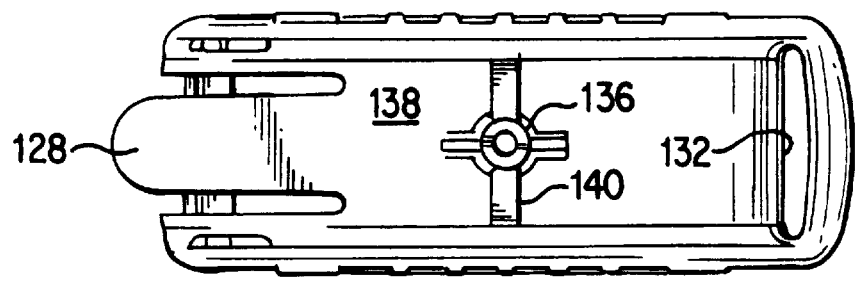
Figure 7D:
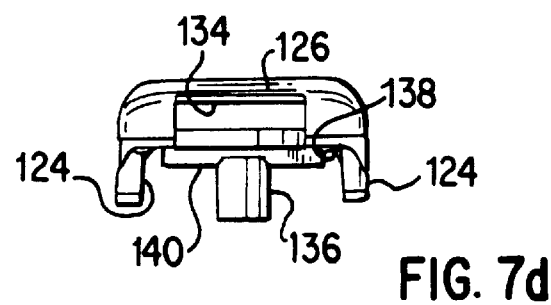
Figure 8A:
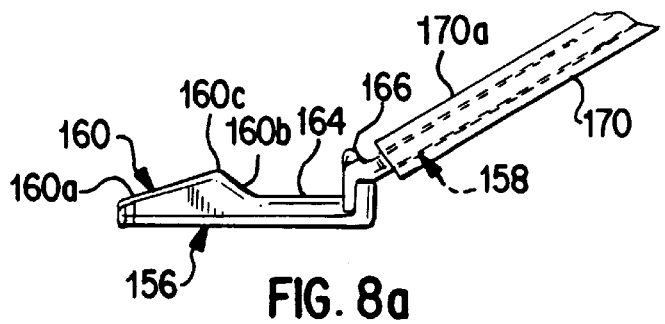
FIGS. 8a–8c are orthogonal views of a clip for use with the seat belt positioner of FIG. 5.
Figures 8B, 8C:
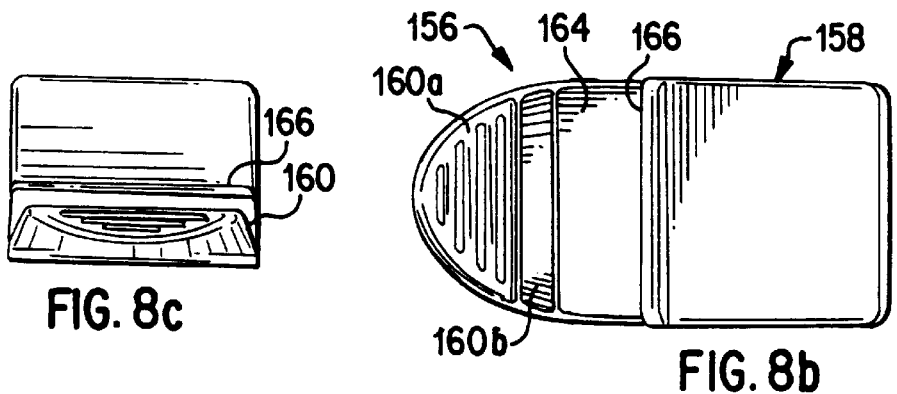

An exemplary booster seat embodying the principles of the invention is shown in FIG. 1. The seat 10 includes a shell 12 (FIGS. 2–4) covered by a cushion or pad 13, a belt positioner 14 and size indicia 16.

The shell 12 includes an upper back portion 20 and a lower seat portion 24 connected to each other by an integral, or living, hinge 28. Advantageously, the integral hinge 28 allows the shell to be molded as a single piece with the upper and lower portions 20, 24 essentially coplanar (FIGS. 2–3) while permitting the upper and lower portions 20, 24 to pivot toward each other about the hinge 28 to form a booster seat configuration (FIG. 4). When the upper and lower portions 20, 24 have been pivoted together, locking rods 25 extend through a connecting joint 27 (FIG. 4) formed by the upper and lower portions 20, 24 to lock the shell 12 in the booster seat configuration. In preferred embodiments, each rod 25 includes a pair of nails, with one nail extending in the seat from each side and going about half way across the seat.

The upper back portion 20 includes a back wall 30 and a pair of side walls 32 extending from the lateral edges of the back wall 30. Each side wall 32 includes an outer surface 32a facing away from the back wall 30 that includes a flat region 34 for receiving the belt positioner 14. The back wall 30 includes an inside surface 52, an outside surface 54, and an upper mating surface 56 that extends between the upper and lower surfaces 52, 54. The upper mating surface 56 includes a pair of mortises 46, 48 disposed in spaced-apart relation.

The lower seat portion 24 includes a back wall 36 and a pair of side walls 38. The back wall 36 includes an outside surface 60, an inside surface 62, and a lower mating surface 64 extending between the outside surface 60 and the inside surface 62. A pair of tenons 68, 70 project outwardly from the lower mating surface 64 and are disposed in spaced-apart relation to engage the mortises 46, 48, respectively.

The sidewalls 32 include apertures 50 and 66. Apertures 50 are aligned along an axis that extends through the upper back portion 20 and, preferably, through the connecting joint 27. Apertures 66 are aligned along an axis that extends through the lower seat portion 24. If desired, a handle recess (not shown) can be molded into the outside surface 54 of the back wall 30 to facilitate handling of the booster seat and a plurality of feet 44 can be formed in the back wall 36 of the lower seat portion 24.

The inside surfaces 52, 62 are undulatory and cooperate with each other in the booster seat configuration to provide an ergonomic child-supporting surface 82, as illustrated in FIG. 4. The upper and lower mating surfaces 56, 64 are formed at a predetermined angle relative to each other, and the predetermined angle is interrelated to the shape of the inside surfaces 52, 62 to provide a generally continuous inner surface 82 when the shell is in the booster seat configuration.

Figure 9A:
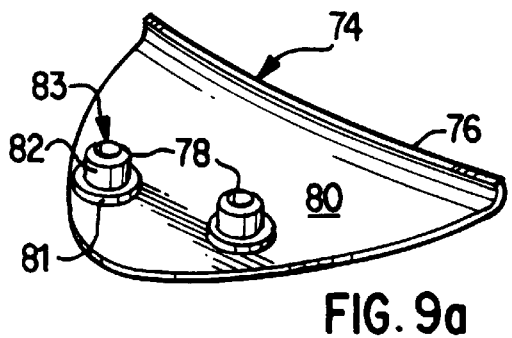
FIGS. 9a–9b are bottom and top isometric views of a side plate for use with the invention.
Figure 9C:
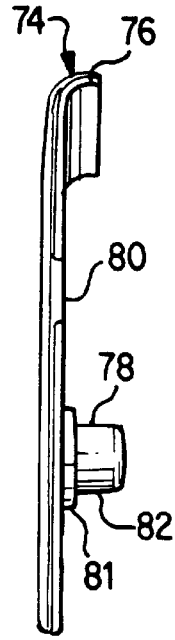
FIG. 9c is a side view of the side plate of FIGS. 9a–9b.
Figure 9B:
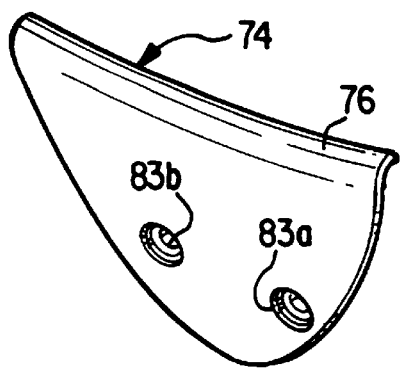

The seat also includes a pair of side plates 74 configured to engage and retain the shell 12 in the booster seat configuration. The side plates 74 illustrated in FIGS. 9a–9c, are generally triangular in shape and include a curved upper lip 76 and a pair of cylindrical bosses 78 extending from an inside surface 80 of the side plate 74. Each boss 78 includes an annular shoulder 81 at its base adjacent the inside surface 80 and a reduced diameter portion 82 extending from the shoulder 81. A central bore 83 extends through each boss 78 and generally conforms to the outer shape of the boss 78 so as to have a first portion 83a extending from the outer surface 85 into the annular shoulder 81, where it joins a reduced diameter portion 83b. The bosses 78 are positioned on the side plate 74 to engage the apertures 50, 66 when the shell 12 is in the booster configuration.

The apertures 50, 66 formed in the upper and lower portions 20, 24, respectively, include dual diameter portions to conformingly receive the bosses 78. Aperture 50 includes a first portion 50a sized and configured to receive the annular shoulder 81 and a reduced diameter portion 50b sized and configured to receive the reduced diameter portion 82. Aperture 66 is substantially similar to the aperture 50.

To assemble the seat in the booster seat configuration, the upper and lower portions 20, 24 are pivoted about the integral hinge 28 until the upper and lower mating surfaces 56, 64 are brought together. As the mating surfaces 56, 64 come together, the tenons 68, 70 formed on the lower mating surface 64 extend into, and engage, the mortises 46, 48 formed in the upper mating surface 56. When the mating surfaces 56, 64 abut each other, the mortises and tenons are fully engaged and the shell 12 is in the booster seat configuration. When the shell 12 is in the booster seat configuration, the side plates 74 are positioned adjacent the side walls 32, 38 to align the bosses 78 with the apertures 50, 66. The locking rods 25 extend between the central bores 83 of the bosses 78 on the side plates 74. In preferred embodiments, the apertures 50, 66 are aligned with the joint 27 so that the rods 25 extend through the mortises 46, 48 and the tenons 68, 70 to provide holding power to retain the shell 12 in the seat configuration.

Although the joint 27 has been described with reference to mortise and tenon joint in combination with a locking rod, it will be appreciated that mortise and tenon joint could include interlocking portions and eliminate the locking rod. For example, the tenons 68, 70 could include a transverse cap to form the tenons 68, 70 in a T-shape, when viewed from the top as in FIG. 2, and the mortises 46, 48 could include recesses formed to receive the caps on the tenons 68, 70 to lock the upper and lower portions 20, 24 together. Likewise, ridges could be formed on the sidewalls of the mortises or tenons and receiving grooves could be formed in the sidewalls of the tenons or mortises, respectively.

The adjustable belt positioner 14 is attached to the shell 12 at the flat region 34 as illustrated in FIG. 1. A preferred positioner 14 is illustrated in FIG. 5 and includes a rack 88, a cover plate 92, a clip 94 and a spring 96. The rack 88 is an elongated member having a base plate 98 and a pair of side walls 100 depending from the base plate 98. The side walls 100 extend upwardly and downwardly from the base plate 98 to define an upper channel 108 and a lower channel 110. The side walls 100 include a plurality of detents 106 arranged in pairs facing each other across the upper channel 108. The base plate 98 includes a central slot 114 extending longitudinally between the side walls 100 and a pair of fastener receiving apertures 116 centered at the ends of the base plate 98.

The cover plate 92 includes a carriage 120 having base plate 122, a pair of side walls 124 depending downwardly from the side edges of the base plate 122, and a clip retainer 126. A first end 118 of the base plate 122 includes a longitudinally extending resilient tongue 128. The clip retainer 126 extends upwardly from the side edges of the base plate 122 and across the first end 130 above the tongue 128, cooperating with the tongue 128 to form a transversely extending clip-receiving aperture 134. A transversely extending web-receiving aperture 132 passes through the base plate 122 at the second end 135 of the base plate 122.

Figure 10A:
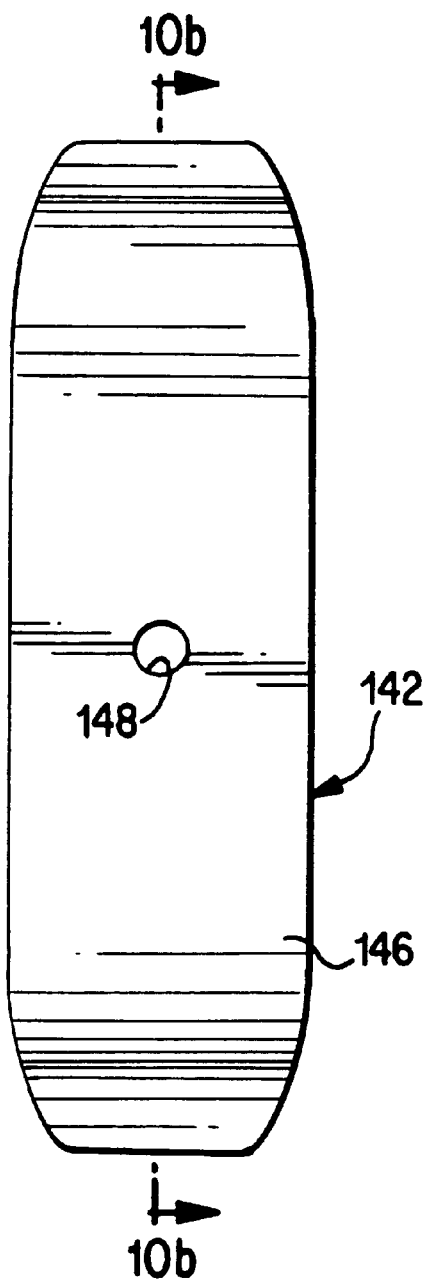
FIG. 10a is a top view of a spring for use with the belt positioner of FIG. 5.
Figure 10B:
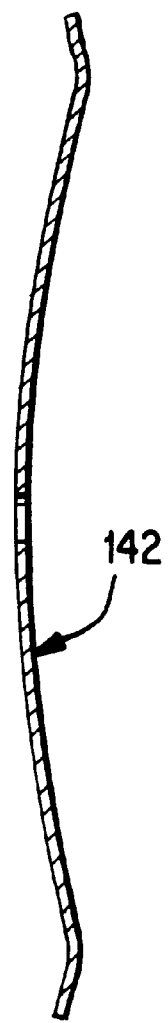
Figure 11:
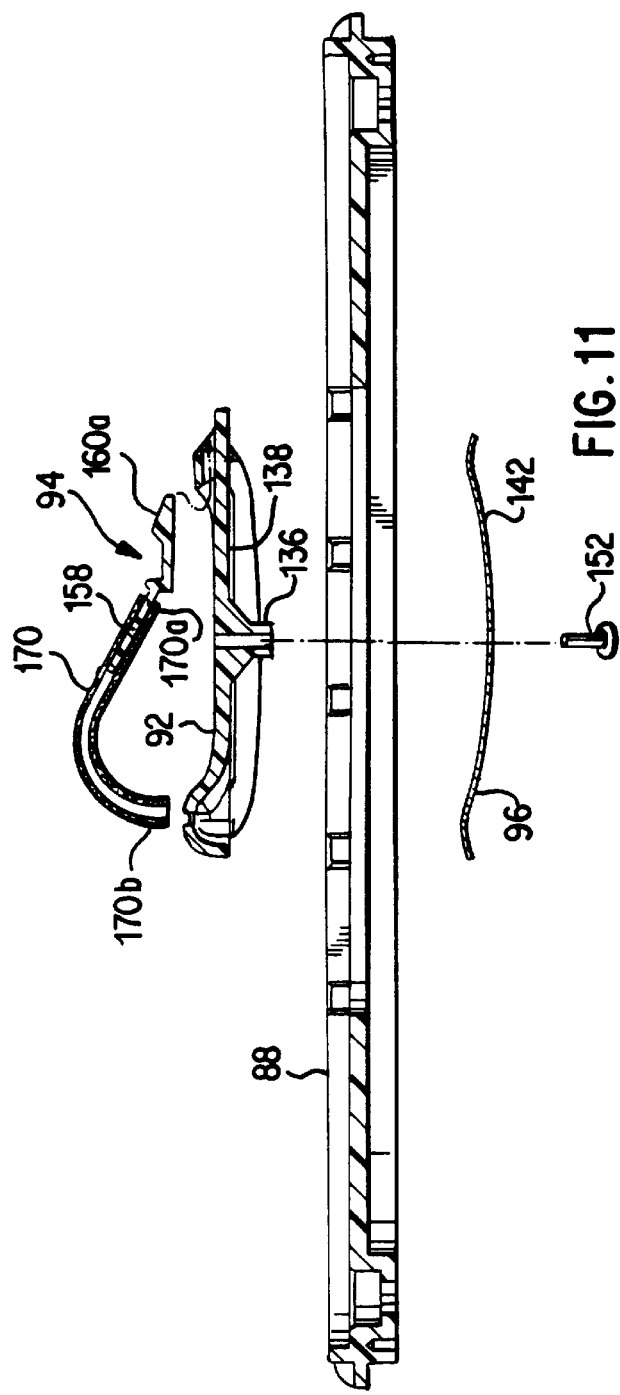
FIG. 11 is an exploded section view taken along the longitudinal centerline of a belt positioner.
Figure 12:
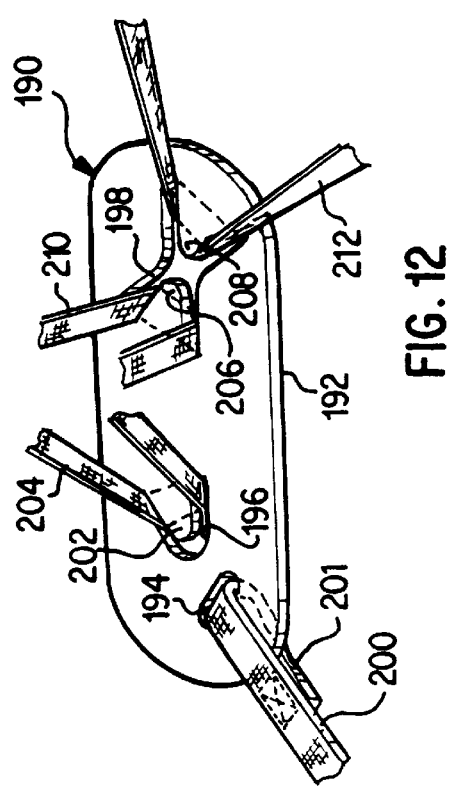
FIG. 12 is a perspective view of a softgoods clip for retaining a seat cover on the booster seat.
Figure 13:
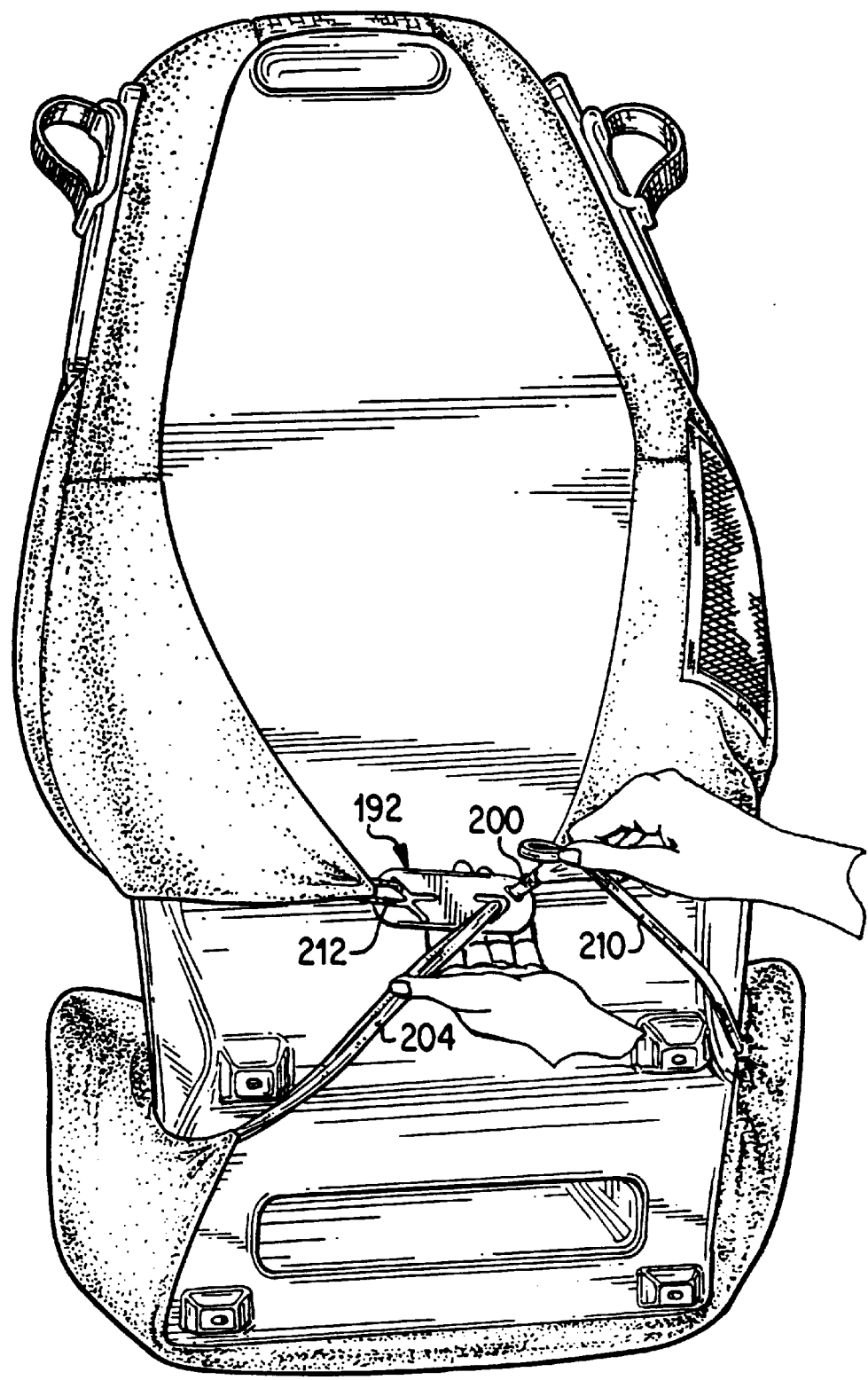
FIG. 13 is a rear perspective view of the booster seat of FIG. 1 showing the softgoods clip of FIG. 12 in position.

A boss 136 projects downwardly from the bottom surface 138 of the base plate 122 so as to extend through, and engage, the slot 114 in the rack 88. An engaging shoulder 140 extends from the boss 136 transversely across the bottom surface 138 to engage the detent pairs 106 formed in the upper channel 108 of the rack 88. A spring 142 forms a resilient member for retaining the cover plate 92 on the rack 88. An exemplary spring 142, illustrated in FIGS. 10a–10b, includes a generally rectangular member 146 having a hole 148 centered therein. The spring 142 is substantially the same width as the lower channel 110 and is configured to slide back-and-forth therein. A fastener 152, such as a rivet, bolt, screw, or the like, attaches the spring 142 to the boss 136 to resiliently retain the cover plate 92 on the rack 88. The spring 142 allows a user to pull the cover plate 92 away from the rack 88 far enough to disengage the shoulder 140 from a detent pair, 106a for example, and move the cover plate 92 to a different position where the shoulder 140 engages another detent pair, 106b for example, without allowing the cover plate 92 to be completely removed from the rack 88.

The clip 94 includes a retainer-engaging portion 156 and a web-attachment portion 158. The engaging portion 156 includes a wedge 160 for fitting between the clip retainer 126 and the tongue 128, and a shoulder 166 separated from the wedge 160 by a flat segment 164. The web-attachment portion 158 includes a flat blade extending upwardly away from the shoulder 166 and is configured to receive a piece of webbing 170.

The wedge 160 is sized to be larger than the clip-receiving aperture 134 and includes a sloping leading surface 160a and a sloping trailing surface 160b that are joined at a peak 160c. When the clip 94 is being inserted into the clip-receiving aperture 134, the leading surface 160a cams against the clip retainer 94 to push the tongue 128 downwardly, effectively enlarging the aperture 134 to allow the wedge 160 to pass under the retainer 126. In similar fashion, when the clip 94 is removed from the aperture 134, the trailing surface 160b cams against the retainer 126 to push the tongue downwardly to allow the wedge 160 to clear the retainer 126. The sloping surfaces 160a, 160b advantageously allow the clip 94 to be inserted into, and removed from, the clip-receiving aperture 134 by using moderate force, while preventing the clip 94 from inadvertently falling out of the aperture 134.

The shoulder 166 is sized and configured to interfere with the clip retainer 126 to prevent further movement of the clip 94 into the clip-receiving aperture 134. As the wedge 160 enters the clip-receiving aperture 134 and clears the clip retainer 126, the resiliency of the tongue 128 pushes the clip 94 upwardly to position the flat segment 164 against the underside of the clip retainer 126. When the clip 94 is in position, the wedge 160 and the shoulder 166 lie on opposite sides of the clip retainer 126 and cooperate with the resilient tongue 128 to maintain the clip 94 in engagement with the clip retainer 126.

The clip 94 cooperates with the cover plate 92 and the piece of webbing 170 to retain a vehicle seat belt in the proper position. The webbing 170 preferably includes a tube of material having a first end 170a and a second end 170b. The first end 170a slides over and covers the web attachment portion 158, preferably by stitching, and the second end 170b is passed through the web-receiving aperture 132. Once through the aperture 132, the second end 170b is folded back against itself and stitched thereto. The goal of stitching the second end 170b to itself is to ensure that the second end 170b does not back out through the aperture 132 under ordinary usage.

The assemble positioner 14 is positioned against the flat region 34 of the sidewalls 32 through an opening in the cushion 13, preferably with one positioner 14 on each side of the shell 12. Screws, rivets or other suitable fasteners 35 extend through the fastener-receiving apertures 116 and through the side wall 32 to rigidly attach the belt positioner 14 to the shell 12. Of course, adhesives, bonding agents, or the like can be used to attach the positioner 14 to the shell 12. Preferably, the cushion 13 includes tabs (not shown) that can be positioned between the rack 88 and the sidewall 32 to hold the cushion 13 in place at the belt positioner 14. It will be appreciated that the cushion 13 can also be produced without an opening for the belt positioner 14, with the fasteners 35 directed through the cushion 13.

Operatively, the cover plate 92 straddles the side walls 124 of the rack 88 with the engaging shoulder 140 disposed in one pair of detents 106 and the boss 136 extending downwardly through the slot 114. The spring 142 is disposed in the lower channel 110 and the fastener 152 attaches the spring to the boss 136, thereby retaining the cover plate 92 on the rack 88. To position the seat belt shoulder strap, the clip 94 is removed from the clip-receiving aperture 134, the shoulder strap is laid against the cover plate 94 and the clip 94, with the webbing 170 attached, is passed over the seat belt and inserted into the aperture 134. Thus, the cover plate 92 webbing 170 and clip 94 complete a circuit surrounding the shoulder strap. Advantageously, the clip/webbing combination retains the seat belt in the proper position under ordinary conditions, but permits the seat belt to move as necessary in the event of an impact. Thus, the adjustable belt positioner 14 of the invention does not provide a load path for the seat belt during an accident.

Another important feature of the invention provides indicia 180, useful to parents, for determining whether the booster seat 16 is appropriate for a particular child. The indicia 180 includes markers for indicating the maximum 182 and minimum 184 height, respectively, of a child seated in the booster seat 10. Accordingly, a parent positions the child in the seat and ensures that the top of the child's shoulders falls between the markers 182,184. If the top of the child's shoulders falls outside the indicated range, the child is either too large or too small. Of course, the indicia 180 could be used to indicate head height of an appropriately sized child rather than shoulder height.

The indicia 180 include tabs or markers affixed to the seat 10. In preferred embodiments, the indicia includes fabric tabs stitched to the pad 13. However, any suitably durable material and any suitable attachment method can be used.

For example, the indicia 180 can be integral with the pad 13 or the indicia 180 can be formed on the shell 12, with apertures formed in the pad 13 to expose the indicia 180.

A further aspect of the invention includes a softgoods clip 190 for retaining the pad 13 on the shell 12. In a preferred embodiment, the clip 190 includes a flat plate 192 having three apertures 194, 196, 198. Aperture 194 is generally oval and is sized to receive a first cord 200 that is attached to the pad 13 at a first position. Cord 200 is preferably elastic and includes a first end 201 that is passed through the aperture 194 and stitched to itself, thereby permanently attaching the clip 190 to the pad 13. Aperture 196 is a V-shaped opening, forming a V-shaped tab 202 having an apex pointed generally at aperture 194. The tab 202 is configured to removably receive a second cord 204 attached to the pad 13 at a second position generally opposite the attachment point of the first cord 200. Aperture 198 is an X-shaped opening, forming second and third opposing V-shaped tabs 206, 208. The opposing tabs 206, 208 are oriented to removably receive third and fourth cords 210, 212 that are attached to the pad 13 at third and fourth positions, such that the clip 190 receives cords from four separate positions on the pad 13. Preferably, all of the cords are elastic and cords 204, 210, 212 include loops for engaging the first, second and third tabs 202, 206, 208. Of course, additional apertures can be included to receive additional cords from, for example, opposite sides of the pad 13, without departing from the scope of the invention.

The various features of the invention have been described in relation to a child booster seat. However, it will be appreciated that any of the features, such as the size indicia, for example, can be used on any seat, and the features described are not limited to use on booster seats. Moreover, variations and modifications exist which would not depart from the scope of the invention. For example, the locking rods 25 need not extend all the way across the connecting joint.

What is claimed:

1. A seat for safely restraining a child in a vehicle, the seat being suitable for use by children having seated heights ranging between a predetermined maximum seated height and a predetermined minimum seated height, said seat comprising:
    a shell having an upper, back portion and a lower, seat portion having a seating surface, the maximum seated height referring to the maximum vertical distance between the seating surface and shoulder of the largest seated child that can be safely restrained in said seat and the minimum seated height referring to the minimum vertical distance between the seating surface and shoulder of the smallest seated child that can be safely restrained in said seat;
    first and second size indicia disposed on the back portion, said first size indicium being located at a position corresponding to the maximum seated height and said second size indicium being located at a position corresponding to the minimum seated height, the first size indicium being configured such that when a parent places a child in said seat and the seated child's shoulder position is disposed above said first size indicium, the position of the first size indicium below the child's shoulder indicates to the parent that the child is too big for said seat and therefore not safely restrainable in said seat, and the second size indicium being configured such that when a parent places a child in said seat and the seated child's shoulder position is disposed below said second size indicia, the position of the second indicium above the child's shoulder indicates to the parent that the child is too small for said seat and therefore not safely restrainable in said seat.

2. The seat of claim 1 wherein the vehicle includes a passenger shoulder harness and lap belt, said seat is devoid of a restraint harness and the child is restrained in said seat by the passenger shoulder harness and lap belt.

3. The seat of claim 1 wherein each of said first and second size indicia includes a fabric marker coupled to said shell.

4. The seat of claim 3 further including a fabric cover disposed on said back portion and wherein said fabric markers are disposed on said cover.

5. The seat of claim 4 wherein said fabric markers are formed integrally with said cover.

6. The seat of claim 1, the back portion having a center portion defining a back support surface and left and right sides, wherein said first and second indicia are located adjacent to one of said left and right sides so that a parent may easily compare one of a head and shoulder position of the seated child with said first and second indicia.

7. The seat of claim 1 wherein the vehicle includes a shoulder belt, further including a belt positioner adjustably coupled to said back portion for positioning the shoulder belt relative to the child.

8. The seat of claim 7, wherein said belt positioner includes a shoulder belt retaining member coupled to a guiding member fixed to said back portion, wherein the shoulder belt retaining member is slidable among a plurality of shoulder belt positions defined by said guiding member.

9. The seat of claim 8, wherein said plurality of shoulder belt positions corresponds to a series of vertically spaced notches sized to releasably receive a corresponding protrusion formed on said shoulder belt retaining member.

10. The seat of claim 7 wherein said belt positioner is adjustable among a plurality of positions, at least one of said plurality of positions being appropriate for use with a child having a seated height equal to the maximum seated height and at least one other of said plurality of positions being appropriate for use with a child having a seated height equal to the minimum seated height.

11. A seat for restraining a child in a vehicle, the vehicle including a passenger shoulder harness and a lap belt, said seat comprising:
    a shell having an upper back portion and a lower seat portion; and
    size indicia disposed at predetermined locations relative to the upper back portion indicating a height limit for a child seated in said seat, said size indicia including a first marker indicating a maximum height for the child and a second marker indicating a minimum height for the child;
    wherein said seat is devoid of a restraint harness and the child is restrained in said seat by the passenger shoulder harness and lap belt.

12. The seat of claim 11, wherein each of said first and second markers includes a fabric marker coupled to the shell.

13. The seat of claim 12 further including a fabric cover disposed on said back portion and wherein said fabric markers are disposed on said cover.

14. The seat of claim 11 wherein the vehicle includes a shoulder harness and further comprising a belt positioner adjustably coupled to said back portion for positioning the shoulder harness relative to the child.

15. The seat of claim 14 wherein said belt positioner is positionable in a plurality of positions, at least one of said plurality of positions being appropriate for use with a child having a seated height equal to the maximum seated height and another of said plurality of positions being appropriate for use with a child having a seated height equal to the minimum seated height.

16. A method for seating a child in a child's car seat, the seat being suitable for use by children having a seated height between predetermined maximum and minimum seated heights, the seat having a lower, seat portion defining a seating surface and an upper, back portion, the maximum seated height corresponding to the maximum vertical distance between the seating surface and the seated height of the largest child suitable for said seat and the minimum seated height corresponding to the minimum vertical distance between the seating surface and the seated height of the smallest seated child suitable for said seat, said method comprising the steps of:

placing a first and second size indicium on the seat upper back portion, the first and second size indicium being positioned on the seat so as to be comparable with the child's seated height;

placing the child on the seat portion with the child's back against the back portion;

determining whether the child's seated height is less than the maximum seated height by reference to the first size indicium; and if the child's seated height is less than the maximum seated height, securing the child in the seat.

17. The method of claim 16 further comprising the step of determining whether the child's seated height is greater than said second indicium and if the child's seated height is less than the maximum seated height and greater than the minimum seated height, securing the child in the seat.

18. The method of claim 11, wherein the first size indicium is positioned on the seat back so as to correspond to the top of a shoulder of the child having a seated height corresponding to the maximum seated height and wherein said step of determining whether the child's seated height is less than the maximum seated height includes determining whether a shoulder of the child is positioned below the first size indicium.

19. The method of claim 16 wherein the vehicle includes a shoulder belt and the seat further including a belt positioner adjustably coupled to the back portion for positioning the shoulder belt relative to the child, further including the step of adjusting the belt positioner according to the shoulder height of the seated child.

20. The seat of claim 19, said belt positioner comprising a movable shoulder belt retaining member retained in a guiding member fixed to said back portion, wherein the shoulder belt retaining member is slidable among a plurality of shoulder belt positions defined by said guiding member.

21. The seat of claim 20, wherein said plurality of shoulder belt positions corresponds to a series of vertically spaced notches sized to releasably receive a corresponding protrusion formed on said shoulder belt retaining member.

22. The seat of claim 19, wherein said first and second indicia are disposed adjacent to said wall so that a parent may readily determine whether one of the shoulder and head of the seated child is positioned within the range of appropriate seating heights.

23. A child car seat for retaining an appropriately sized child in a vehicle using the vehicle's passenger shoulder belt to restrain the child's torso and thereby retain the child in the seat, said seat comprising:

a body having a side wall and an inside surface, said body defining an upper back and seating surface of said child car seat;

first and second indicia disposed on said inside surface, said first and second indicia indicating a range of appropriate seated heights, the range being defined by a maximum seated height corresponding to the shoulder position of the largest child appropriately sized for said car seat and a minimum seated height corresponding the shoulder position of the smallest child appropriately sized for said car seat, wherein said first and second size indicia are positioned so as to indicate to a user whether a child is of an appropriate size for said seat by reference to whether the seated child's shoulder position is disposed below said first indicium and above said second indicium; and a belt positioner mounted on said side wall, said belt positioner being positionable among a plurality of positions between the heights of said first and second indicia.

24. A seat for restraining a child in a vehicle using the vehicle's lap and shoulder belt, the seat being suitable for use by children having a predetermined maximum seated height, the seat comprising:

a shell having an upper, back portion and a lower, seat portion;

a size indicium disposed on the back portion and located at a position corresponding to the maximum seated height; and a belt positioner mounted on said side wall, said belt positioner including:

a guide fixed to said back portion and defining a plurality of shoulder belt positions; and a retaining member for releasably retaining the vehicle shoulder belt, said retaining member being slidingly coupled to said guide and positionable among said plurality of shoulder belt positions;

wherein the vehicle shoulder belt is positionable across the shoulder of children having seated heights less than the position corresponding to the maximum seated height by positioning the said retaining member.

25. The seat of claim 24 wherein said size indicium includes a fabric marker coupled to said shell.

26. The seat of claim 25 further including a fabric cover disposed on said back portion and wherein said fabric marker is disposed on said cover.

27. The seat of claim 26 wherein said fabric marker is formed integrally with said cover.

28. A child car seat for retaining an appropriately sized child in a vehicle using the vehicle's passenger shoulder belt to restrain the child's torso and thereby retain the child in the seat, said seat comprising:

a body having a side wall and an inside surface, said body defining an upper back and seating surface of said child car seat;

first and second indicia disposed on said inside surface, said first and second indicia indicating a range of appropriate seated heights; the range being defined by a maximum seated height corresponding approximately to the shoulder position of the largest child appropriately sized for said car seat and a minimum seated height corresponding approximately to the shoulder position of the smallest child appropriately sized for said car seat, wherein said first and second size indicia are positioned so as to indicate to a user whether a child is of an appropriate size for said seat by reference to whether the seated child's shoulder position is disposed below said first indicia and above said second indicia.

29. The seat of claim 28 wherein said first and second indicia includes a fabric marker coupled to said shell.

30. The seat of claim 29 further including a fabric cover disposed on said back portion and wherein said fabric marker is disposed on said cover.

31. The seat of claim 30 wherein said fabric marker is formed integrally with said cover.

* * * * *